Nov. 17, 1964    R. J. PURTELL    3,157,193
IRRIGATION SYSTEM

Filed Nov. 5, 1962    9 Sheets-Sheet 1

FIG. 1

INVENTOR.
RUFUS J. PURTELL
BY

Nov. 17, 1964 R. J. PURTELL 3,157,193
IRRIGATION SYSTEM
Filed Nov. 5, 1962 9 Sheets-Sheet 2

FIG. 2

INVENTOR.
RUFUS J. PURTELL
BY

INVENTOR.
RUFUS J. PURTELL

Nov. 17, 1964  R. J. PURTELL  3,157,193
IRRIGATION SYSTEM

Filed Nov. 5, 1962  9 Sheets-Sheet 8

RUFUS J. PURTELL
INVENTOR.

BY

HIS ATTORNEY

United States Patent Office 3,157,193
Patented Nov. 17, 1964

3,157,193
IRRIGATION SYSTEM
Rufus J. Purtell, Brownfield, Tex., assignor to Robert B. Knight, J. B. Knight, and Jean Knight Jones, all doing business as J. B. Knight Company, all of Brownfield, Tex.
Filed Nov. 5, 1962, Ser. No. 236,474
21 Claims. (Cl. 137—344)

This invention pertains to agricultural irrigation systems and, more particularly, to those systems wherein the pipe is on the ground while watering and elevated while being moved.

This application is a continuation-in-part of my previous patent application, Serial No. 153,628, filed November 20, 1961, and now abandoned. This application itself was co-pending with one of my prior U.S. patent applications which has since issued on November 21, 1961, as Patent No. 3,009,646. Cross references pursuant to Rule 78 include the additional following pending patent applications:

| Serial No. | Filing Date |
|---|---|
| 26,636 | April 19, 1960 |
| 172,997 | February 13, 1962 (now Patent No. 3,087,680) |

Over a large part of the United States, agricultural fields are irrigated by pipes extending through the field carrying water under pressure. The water is discharged through sprinklers set at intervals along the pipe. The moving of these pipes from one location to another presents a problem which is the subject of numerous patents. One system for moving the pipes is shown in my U.S. Patent number 3,009,646. According to this system, the pipe lies on the ground while watering. To move the pipe, the water is drained from it, thus, lightening the pipe, and the pipe is elevated above ground. This has numerous advantages which are fully explained in that patent.

There are economic and design limitations in an irrigation system as to the amount of water which may be conveyed through a pipe of given diameter, the maximum pressure which may be used, the number of sprinklers, and the amount of water that each sprinkler may discharge. If an attempt is made to discharge too much water per sprinkler, the soil will not absorb the water. The more sprinklers that are provided increase the expense of the system.

One of the solutions to this problem is shown in my co-pending patent application filed March 14, 1961, Serial No. 95,645, now Patent No. 3,094,282. It discloses a plurality of trailing tubes, each carrying one or more sprinklers attached to the main pipe. Therefore, more sprinklers may be efficiently moved along the field, and the water may be applied in more desirable rates.

An object of this invention is to provide an improved means for elevating a pipe and transporting it to a new location.

Another object of this invention is to provide an improved means for irrigating from one pipe while a plurality of trailing tubes are carried by said pipe to discharge water from additional sprinklers carried upon said trailing tubes.

Further objects are to achieve the above with a device that is sturdy, compact, durable, simple, and reliable, yet inexpensive and easy to manufacture.

The specific nature of the invention, as well as other objects, uses, and advantages thereof, will clearly appear from the following description and from the accompanying drawings, the different views of which are not necessarily to the same scale, in which.

As may be seen in the drawings, the system includes pipe 20 which extends across the field to be watered. The pipe has a plurality of sprinklers 22 mounted thereon. Vehicles 24 are for the purpose of moving the pipe 20 from one location to another.

Each vehicle 24 includes wheel 26. Each wheel 26 has axle 27 about which is pivoted frame 28. The frame 28 extends to the front and to the rear of the wheel 26. On the front of the frame 28 is shoe 30 which is a ground engaging element. It prevents the frame 28 from rotating forward about the axle of the wheel 26. The shoe 30 is mounted on vertical plate 32 which has a plurality of holes by which it may be attached at varying heights to the frame 28. To the rear of the wheel 26 there is caster 34 which also is a ground engaging element to prevent the frame from rotating about the axle of the wheel 26. The caster 34 is mounted in sub-frame 36 which is adapted to pivot about a vertical axis on the frame 28.

Figures 7, 8, 9, 10:
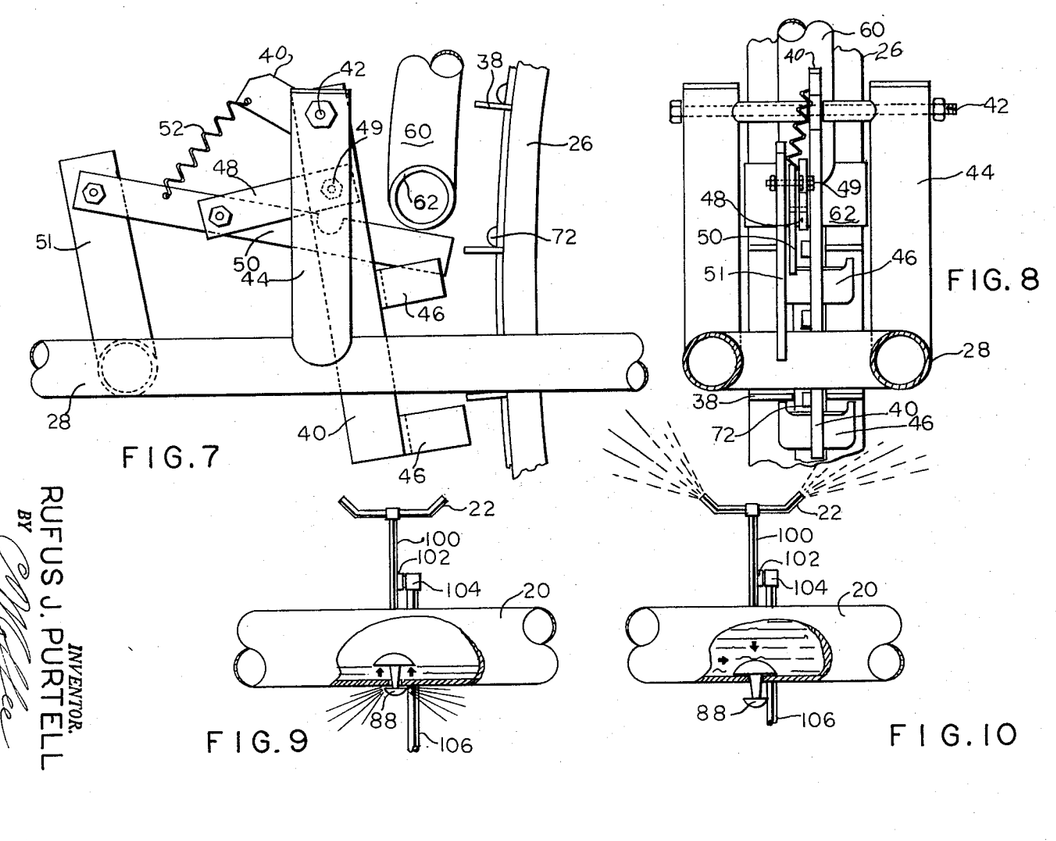
FIG. 7 is a partial, side elevational view showing the details of the lock partially open.
FIG. 8 is a rear view of the lock.
FIG. 9 shows a sprinkler on the pipe with the valve draining water from the pipe.
FIG. 10 is similar to FIG. 9, showing the valve closed.
Figure 11:
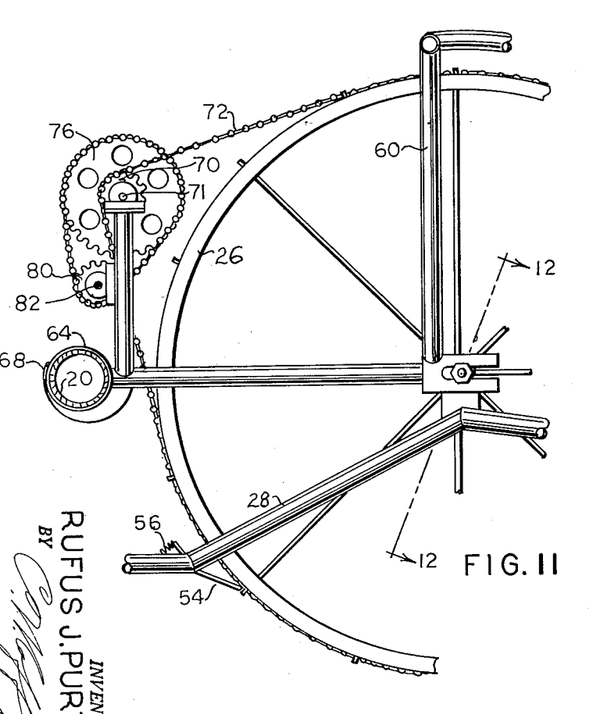
FIG. 11 is a partial, side view of one wheel unit.
Figure 12:
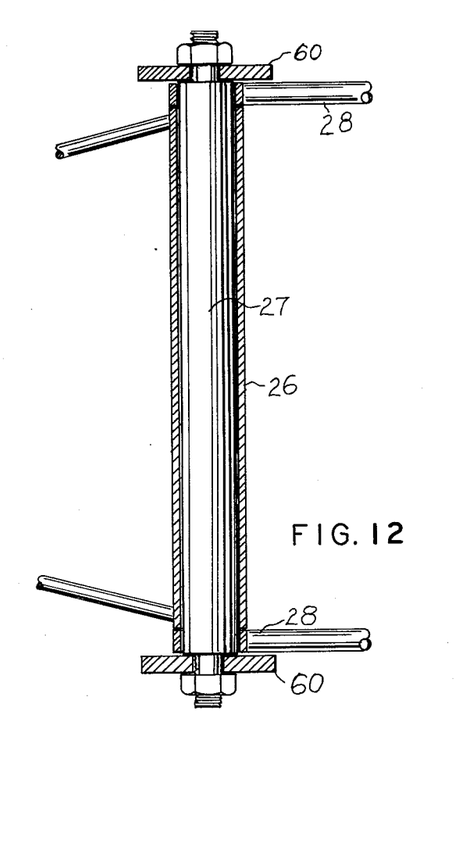
FIG. 12 is a partial axial, sectional view of a wheel unit, taken on line 12—12 of FIG. 11.

Each wheel 26 has a plurality of lugs 38 along its outer surface which are adapted to work as cleats to prevent slippage of the wheel on the earth. Also, these lugs 38 co-operate with a lock on the frame 28 so as to prevent the wheel 26 from moving (FIG. 7). This lock is mounted to the rear of the wheel 26 and includes bell crank 40 which is adapted to pivot about bolt 42 extending between elements 44 on the frame 28. Dogs 46 are on the lower end of the bell crank 40 and are adapted to engage the lugs 38. When they are so engaged, they effectively lock the frame 28 to the wheel 26 so that there is no effective relative rotation between them. Actuating pitman 48 is pivoted to the bell crank 40 between the pivot bolt 42 and the dogs 46 by bolt 49. Trip lever 50 is pivoted to ear 51 of the frame 28. One end of actuating pitman 48 is pivoted to the mid-point of the trip lever 50. The bolt 49, by which actuating pitman 48 is attached to the bell crank, protrudes and forms a stop for the upward movement of the trip lever 50. Spring 52 interconnects the free end of the bell crank 40 to the trip lever 50 so that the trip lever 50 is pressed upward against the bolt 49. In the normal rest position, the relation of the pivot of the trip lever 50 to the ear 51, the pivot between the trip lever 50 and the actuating pitman 48, and the pivot bolt 49 are past dead center so that the dogs 46 are effectively locked against movement away from the wheel lugs 38. Force tending to urge the dogs 46 away from the wheel 26 will cause the trip lever 50 to be pressed against the bolt 49; and, therefore, the bell crank 40 is effectively locked in position. If the trip lever 50 is pushed downward, this downward movement acting through the actuating pitman 48 will pull the bell crank 40 and dogs 46 away from the wheel lugs 38, thus, releasing the wheel 26 and frame 28 so that the wheel 26 is free to rotate within the frame 28. The mechanism for moving the trip lever 50 downward will be described later.

Figure 3:
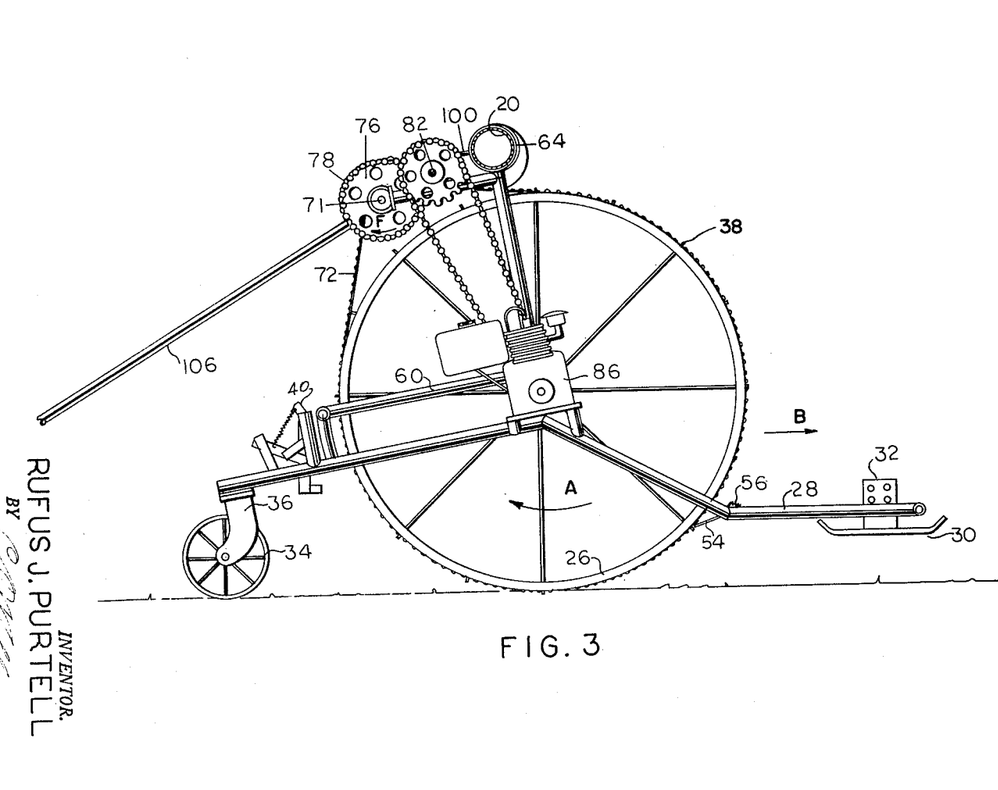
FIG. 3 is a sectional view of the system showing one wheel unit with the pipe in the elevated moving position.

Ratchet plate 54 is mounted on the frame 28 forward of the wheel 26. This ratchet plate 54 is pivoted to the frame 28 about an axis parallel to the axis of the wheel 26. Spring 56 biases the ratchet plate 54 against the lugs 38 of the wheel 26 so that the wheel can rotate only clockwise in direction of arrow A (FIG. 3) to drive the vehicle 24 forward in the direction of the shoe 30 and arrow B (FIG. 3). Ratchet plate 54 may be tied by wire out of operative position, making it possible to drive the wheel 26 backward, as will be described later.

Arm 60 is pivoted for rotation about the axis of wheel 26. It rotates independently of the frame 28. The arm 60 is in the form of a large bell crank. Bar 62 is on one end of the bell crank and extends parallel to the axis of the wheel 26. The bar 62 is adapted to strike the trip lever 50, thus, actuating the lock as described above. On the other end of the arm 60 is the clamp 64. The clamp 64 is split cylinder, the two halves of the cylinder being connected together by a hinge. Clasps 68 are attached to the cylinder so that the pipe 20 is firmly clamped within the clamp 64 and the clasps 68 are closed to hold it in place. The axis of the cylinder of clamp 64 is parallel to the axis of the wheel 26. Therefore, with pipe 20 in place, the pipe itself is parallel to the axis of the wheel 26; and when the wheel rotates, the pipe 20 is moved normal to its axis.

Figures 4, 5, 6:
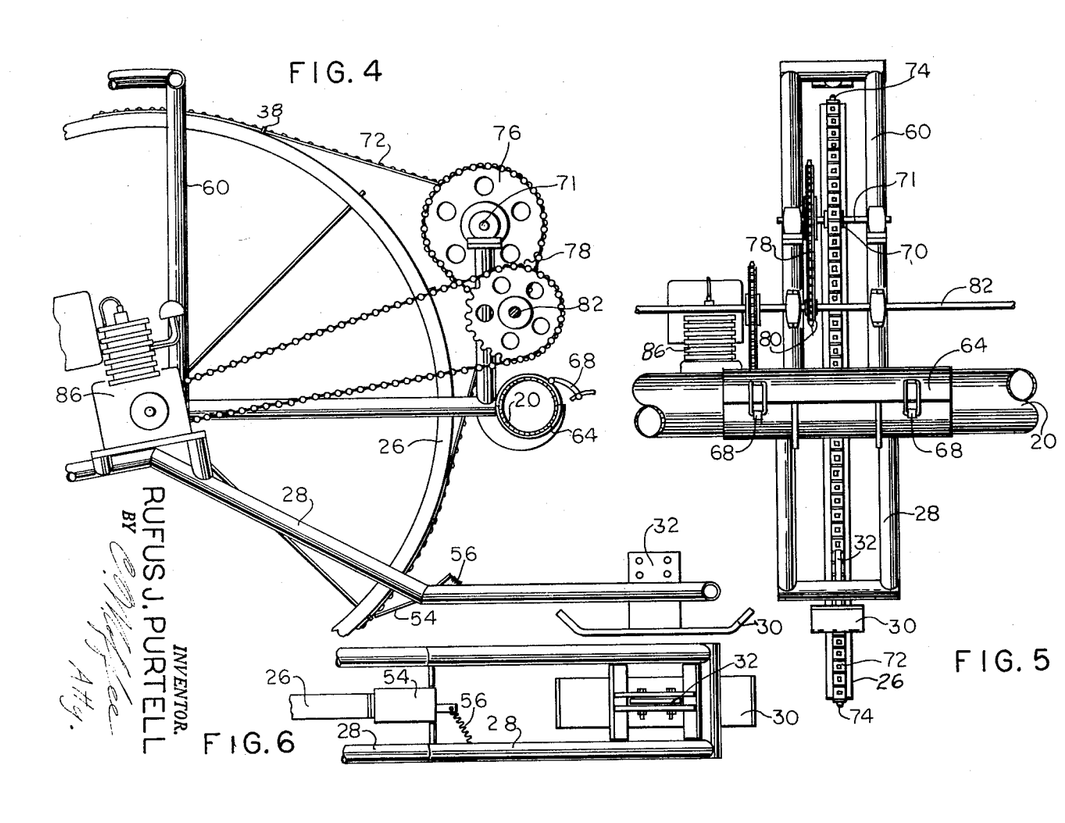
FIG. 4 is a partial, side view of one wheel unit with the pipe in an intermediate position, also showing the clamp unlatched.
FIG. 5 is a front, elevational view of one wheel unit with the pipe illustrated in a partially elevated position.
FIG. 6 is a partial plan view showing the details of the front ground engaging unit.

Sprocket 70 (FIG. 5) is mounted for rotation on shaft 71 upon the arm 60 adjacent to clamp 64. Shaft 71 is parallel to the axis of wheel 26. Chain 72 extends around wheel 26 and sprocket 70. The chain engages points 74 on the periphery of the wheel 26 so that the wheel 26 itself acts as a sprocket in this regard. Sprocket wheel 76 is on the shaft 71 and is driven by short chain 78 from drive sprocket 80 (FIG. 5). Shaft 82 is journaled for rotation on arm 60 and carries drive sprocket 80. The shaft 82 extends from one vehicle to the next; and between vehicles, the shaft 82 is in the form of a hollow tube.

There is a master vehicle upon which is mounted prime mover 86. The prime mover 86 is connected by a mechanism to shaft 82 by which the shaft 82 is rotated. The prime mover 86 is preferably mounted upon the frame 28 aligned with the axis of the wheel 26. Therefore, the shaft 82 may be rotated by a belt or chain. As the arm 60 rotates about the axis of the wheel 26, the shaft 82 is maintained at all times equidistant from the prime mover 86.

With the shaft 82 rotated by the prime mover 86 through the gear train described above, the sprocket 70 is rotated. When the sprocket 70 is rotated, the action of the chain 72 will cause a relative rotation between the arm 60 and the wheel 26. If the lock of bell crank 40 is engaged, the wheel 26 cannot rotate. Therefore, the rotation of sprocket 70 will result in rotation of arm 60 about the wheel 26. However, when arm 60 has rotated so that bar 62 contacts trip lever 50 and releases the lock, the arm 60 no longer rotates relative to frame 28. The bar 62 contacts lever 50 to prevent additional rotation of the arm 60 relative to the frame 28. Therefore, at this time, the continued rotation of the sprocket 70 will cause the wheel 26 to rotate about its axis within the frame 28. The caster 34, bearing against the ground, prevents rotation of the frame 28.

Figure 1:
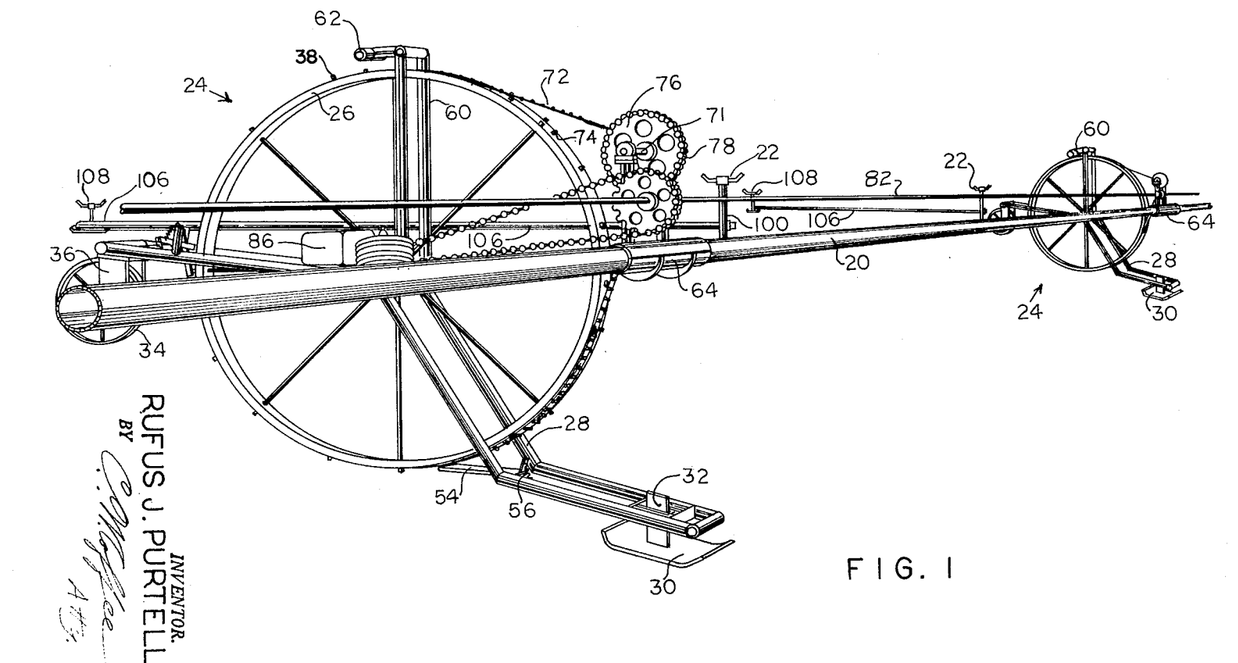
FIG. 1 is a perspective view of a portion of the system according to this invention with the pipe in an intermediate position between watering position and moving position.
Figure 2:
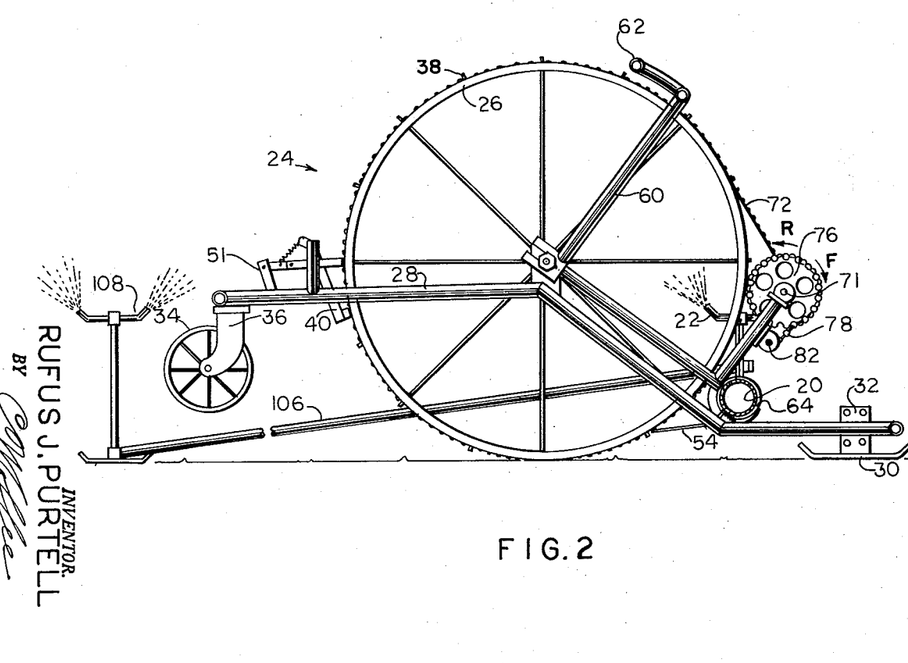
FIG. 2 is a sectional view of the system showing one of the wheel units with the pipe in the lower watering position.

Describing the operation from the position shown in FIG. 2 with the water sprinkling, when the field has received sufficient moisture, the operator turns off the water. When the water is turned off, the pressure in pipe 20 is released; and valves 88 (FIGS. 9 and 10) drain the water from the pipe. The valves 88 are well-known to the art and are commercially available on the market. They operate so that, when there is pressure in the pipe 20, they are closed to maintain the pressure; however, when there is little or no pressure in the pipe 20, they open so that the pipe 20 is self-draining. After the water in the pipe 20 has been drained, the operator starts prime mover 86, thus, rotating the sprocket 70, clockwise as seen by arrow F in FIGS. 2 and 3, causing the arm 60 to rotate and lifting the pipe 20 and shaft 82 with it. They are lifted until they are above the wheel 26 and even past dead center so that the pipe 20 is in a vertical plane which is between the axis of the wheel 26 and caster 34. At this time, the bar 62 releases the lock of bell crank 40 and bears against the lever 50 so that the wheel 26 begins rotating clockwise in the direction of arrow A in FIG. 3, moving the system forward in the direction of arrow B in FIG. 3. While the system is moving from one location to another, the pipe 20 will be about the height of the wheel 26 above the ground, thus, above any growing crops which may be in the field at the time. The torque will raise the shoe 30 off the ground. If the shoe 30 touches the ground it will skid along the ground.

The system will exhibit a certain self-starting feature. Namely, the power requirements for lifting the pipe are greater than the power requirements for moving the pipe after it is lifted. When the pipe 20 is being lifted there will be a certain amount of twist in the shaft 82 as it extends from one vehicle to the other. Therefore the pipe at the vehicles nearest the prime mover 86 will tend to raise before the pipes at the vehicles farther away. However, as the pipe 20 nears the top of the wheel 26 its upward movement is lessened if not stopped; therefore, the torque requirements are less and the shaft 82 will tend to unwind so that the pipe at the vehicles farther away from prime mover 86 tends to catch up. Indeed after the pipe passes over top dead center the pipe will tend to rotate the shaft 82 faster than the prime mover rotates it. I have found that although the pipe lifts from the ground first at the vehicles closer to the prime mover 86 that this self-aligning feature tends to cause the pipe to be aligned and the brakes released on arm 40 and all vehicles at approximately the same time.

When the system has reached the new location, the prime mover 86 is reversed so that it rotates shaft 82 in the opposite direction. Upon shaft 82, rotating in the opposite direction, sprocket 70 rotates in the opposite or counter clockwise direction of arrow R in FIG. 2. However, the wheel 26 cannot operate in the opposite direction because of the ratchet plate 54. Therefore, the arm 60 rotates relative to the wheel 26, moving bar 62 away from trip lever 50. This causes the lock of bell crank 40 to re-engage, locking the frame 28 to the wheel 26. Operation of the prime mover 86 will continue until the arm 60 is such that the pipe 20 is again resting upon the ground; at which time, the prime mover 86 is stopped by the operator. This completes the move from one location to another; and upon attaching the pipe 20 to a source of water pressure, the pipe may again be filled, closing the valves 88 and, thus, beginning the irrigation operation again.

It will be noted that the clamp 64 rests upon the frame 28 a short distance above the ground so that the pipe 20 is supported a distance above the ground at each vehicle 24. This is desirable. If the pipe 20 is lying flat upon the ground while watering, it will have a certain amount of sway or bow when elevated. Then with the sway, it extends a shorter horizontal distance while it is elevated than when it is lying flat on the ground. This causes difficulties on a long stretch of pipe because of the different distances between the end vehicles when the pipe is in the air and when it is lying flat. However, although it is primarily supported by ground, when the pipe 20 is maintained a few inches off the ground at each vehicle 24 while in the lower watering position, the problem will be eliminated.

If the height of the crop is greater than the diameter of the wheel 26, the portion of the arm 60 carrying clamp 64 could be elongated so as to raise the pipe 20 to a higher position during the move.

If it is desired to have the vehicles 24 moved in the reverse direction in order to move the system backward across the field, this may be accomplished by tying the ratchet plate 54 out of operative position. Also, the bar 62 may be tied by wire to maintain the trip lever 50 in the depressed position. With these two elements in place, it will be seen that, when the sprocket 70 rotates in the opposite direction, it will cause the vehicle 24 to move in a reverse direction, i.e. in the direction of caster 34.

It is advantageous to have two or more sprinklers operating in tandem. This is achieved by having each of the sprinklers 22 mounted upon standard 100 (FIGS. 9 and 10). Each standard 100 is attached to the pipe 20 to convey water to the sprinkler 22. Coupling 102, attached to the side of the standard 100, is means to couple elbow 104 to the standard 100. The coupling 102 is parallel to the pipe 20. The coupling 102 also permits the elbow 104 to rotate about the axis of the coupling 102. Elongated tube 106 is attached to the elbow 104 to convey water to sprinkler 108 which is at the extreme end of tube 106. There may be one or more such sprinklers along the tube 106 according to the design of the system. Therefore, it may be seen that, when the system is in the watering position, water is discharged not only from the sprinklers 22, but from the plurality of sprinklers 108.

Figure 16:
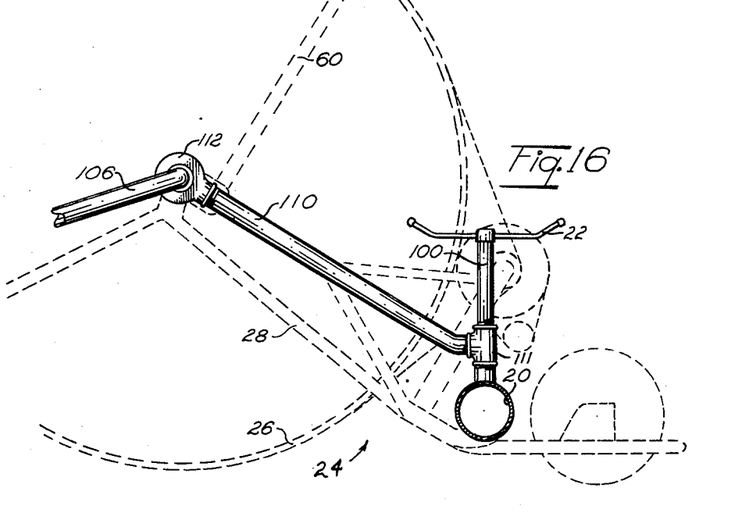
FIG. 16 is a side view of a different embodiment of a connection of the trailing tube to the pipe with a vehicle shown in broken lines in the background.

Another arrangement for connecting elongated tube 106 to the pipe 20 is shown in FIG. 16. By this system it may be seen that a bent conduit 110 is connected from T 111 of the bottom of standard 100 to pipe 20. This conduit 110 terminates at a coupling 112. The coupling 112 is means for permitting the tube 106 to rotate about an axis which is parallel to the axis of the pipe 20. The coupling 112 is coaxial with the axle 27 of the vehicle 24. Therefore a rotation of the arm 60 will not cause the movement of the tube 106 either up or down or backwards or forwards. It is desirable that the tube 106 should not move backwards or forwards because otherwise the vehicle by which the auxiliary sprinkler 108 is mounted tends to dig into the dirt.

Figures 17, 18:
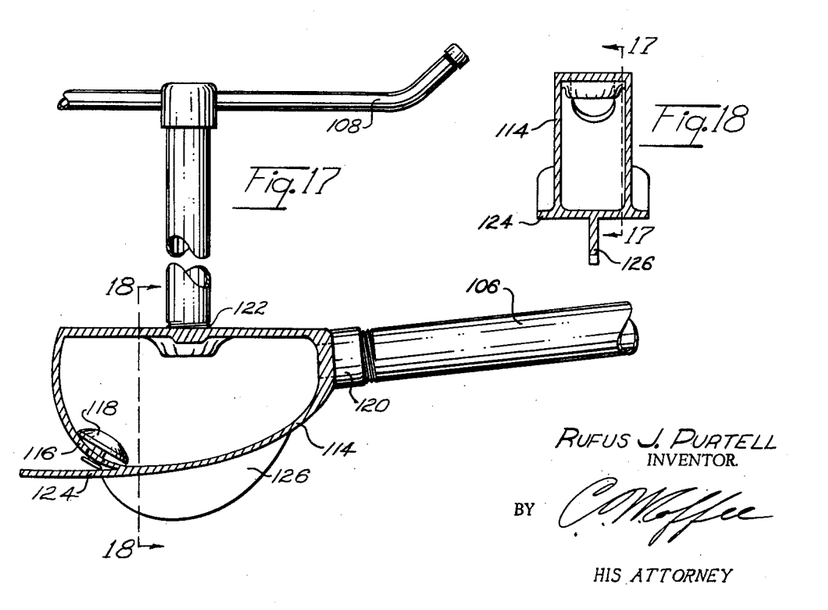
FIG. 17 is a section detailed drawing of a second embodiment of a sled at the terminal of the trailing tube, taken on line 17—17 of FIG. 18.
FIG. 18 is a section view of the second sled taken on line 18—18 of FIG. 17.

Also it is desirable that the tube 106 should be drained of its water to lessen the weight which is being moved. However, valves like the valves 88 which are commercially available are not adapted to fit within tubing which has as small a diameter as that which is desirable to use for tubes 106. Therefore a special draining connector 114 has been provided (FIGS. 17 and 18). As may be seen the connector 114 has a body which has a generally arcuate underside 116. Therefore a hole may be put in the body and the standard draining valve 118 used herein. The inward concavity of the underside 116 permits this to operate in the well-known manner. In addition the connector 114 has a cuff 120 on its forward side by which tube 106 may be connected and an upward turning threaded opening 122 by which a sprinkler 108 may be attached.

Also the connector 114 is provided with a short rearward extending shoe or foot 124 to provide an increased surface for preventing the connector 114 from burying itself into the ground. As an optional embellishment a fin 126 which is aligned with the tube 106 may extend from the bottom of the foot 124. With the vibration of the sprinkler 108 this fin will imbed itself into the ground to provide lateral stability for the sprinkler. However, because of the sloping front of the fin, when the pipe is moved it will move forward satisfactorily. As stated before, the foot 124 will prevent the rest of the connector 114 from burying itself in the ground due to the vibration of the sprinkler.

Figure 13:
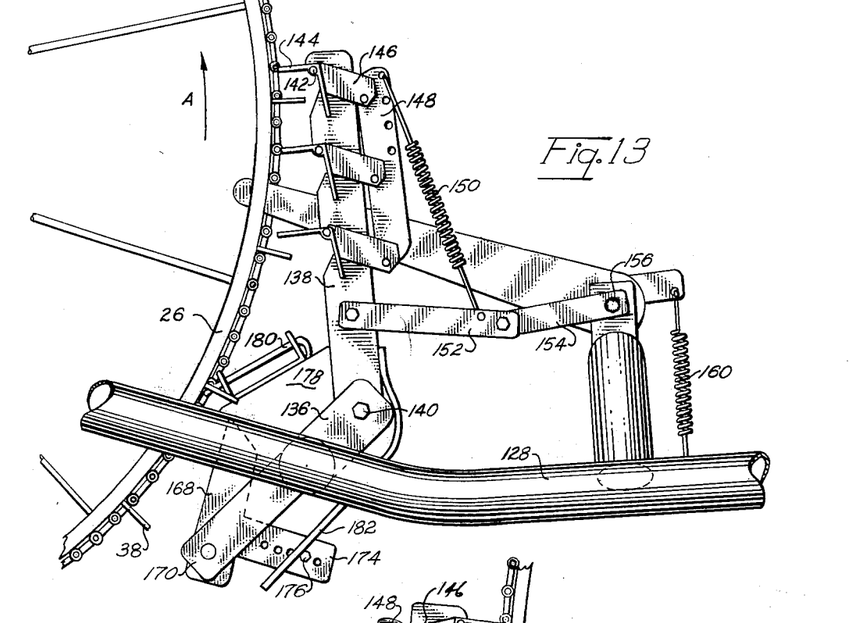
FIG 13 is a partial, side elevational view showing the details of a second embodiment of a lock
Figure 14:
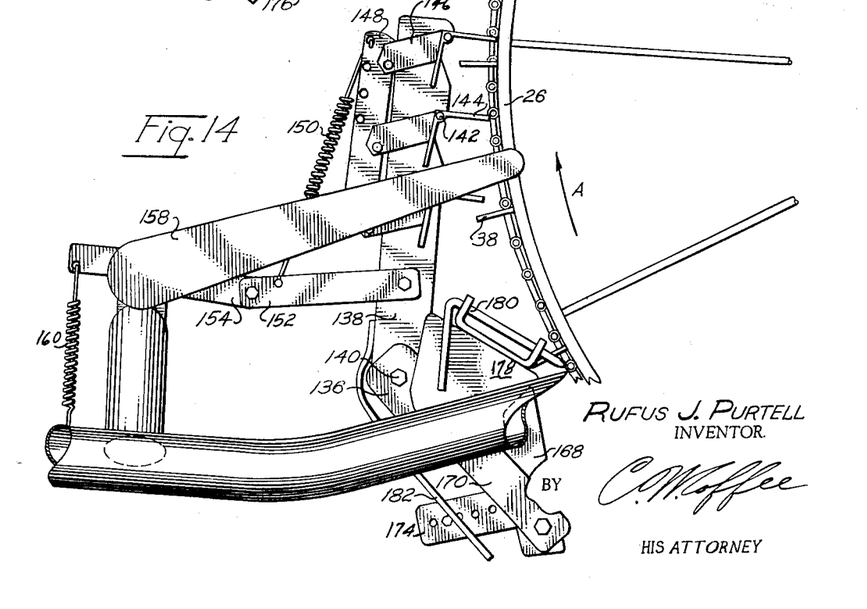
FIG 14 is a partial elevational view showing the other side of the second embodiment of the lock
Figure 15:
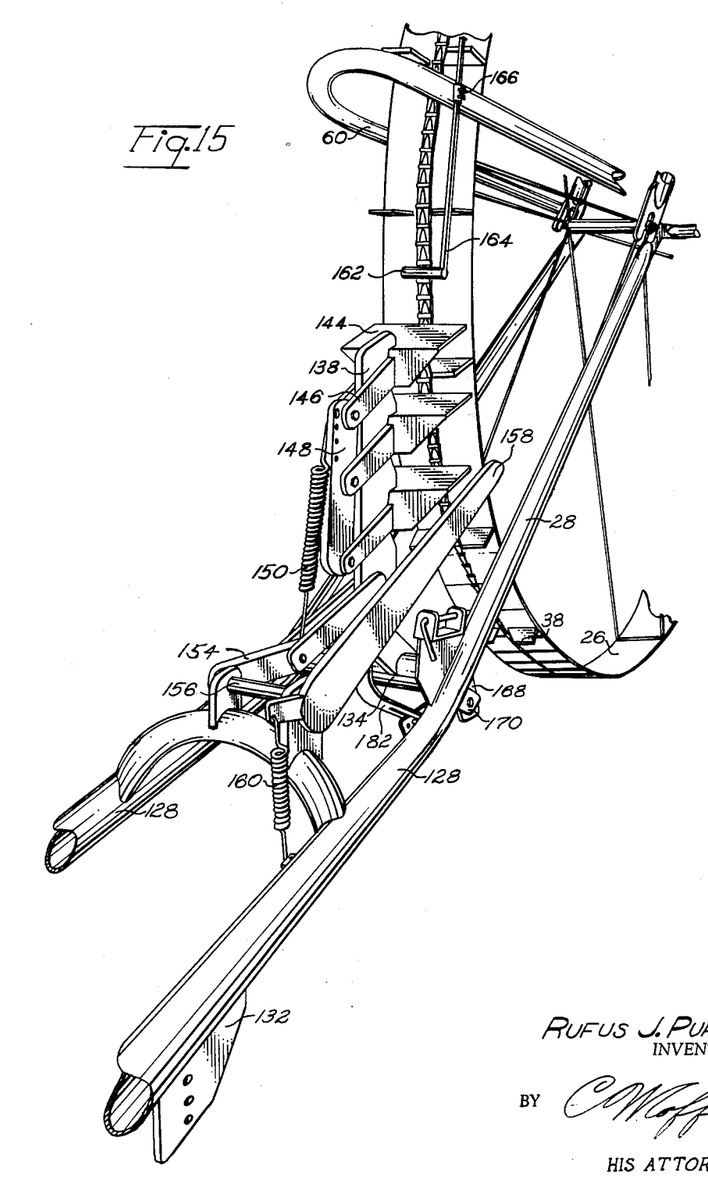
FIG 15 is a partial perspective view of the second embodiment of the lock

FIGS. 13, 14, and 15 illustrate another embodiment of the lock mechanism. In this mechanism it may be seen that the frame 28 includes two tubular members 128 which extend behind the wheel 26. The rear wheel (not shown) is mounted for rotation about an axle which extends from one member 128 to the other. The axle of the rear wheel is mounted between a pair of brackets 132 each of which has a plurality of holes therethrough so that the height of the rear wheel may be adjusted. Immediately behind the wheel 26 there is a cross brace 134 which has an ear 136 extending upward from it. Arm 138 is mounted for rotation on bolt 140 which is in the ear 136 and parallel to the axis of the wheel 26. The arm extends above the bolt 140. Three dogs 144 are pivoted by bolts 142 extending through holes in arm 138. The dogs are adapted to engage the lugs 38 and prevent the wheel from rotating in the direction of arrow A. Tabs 146 extend behind the dogs 144. The end of the tabs are connected together with link 148 and each of the tabs are pivoted by a bolt to the link. Spring 150 extends from the link 148 to pitman 152. The upward rotational movement of dogs 144 is limited by the link 148 striking the arm 138. However, the dogs may be moved downward by each of them rotating individually about bolt 142, extending the spring 150. Therefore it may be seen that although the dogs prevent the wheel 26 from rotating in the direction of arrow A they permit it to rotate in the opposite direction.

The arm 138 is operated by a toggle mechanism which includes the pitman 152 pivoted to the arm and to lever 154. The lever is attached to shaft 156 which also carries lever 158. The lever 158 is normally biased upward by a spring 160 which extends between an extension of lever 158 and the frame as well as spring 150. The lever 158 may be depressed by bar 162 in the same manner as the lock in the previous embodiment. However, the bar 162 is mounted on strut 164 which extends through sleeve 166 which is welded or otherwise attached to the arm 60. Therefore, the position of the arm 60 at the point the brake is released may be adjusted by adjusting the position of the strut 164 within the sleeve 166.

Also as seen in the embodiment of FIGS. 13, 14, and 15, the ratchet plate 54 has been replaced by a ratchet plate 168 which is pivoted from depending ears 170 below the cross brace 134. The ratchet plate 168 is biased toward the wheel by a spring (not shown) which is wrapped around the shaft to which plate 168 is pivoted and one end of the spring bears against one of the depending ears 170 and the other end against the ratchet plate 168. The ratchet plate 168 has a plate 174 extending behind it with a plurality of holes therethrough. The movement of the ratchet plate 168 toward the wheel 26 is limited by the position of bolt 176 in the holes.

Bracket 178 extends above one of the tubular members 128 and carries pin 180 above it. Normally the bar 162 is limited in its manner of movement by striking the pin 180. However, if it is desired to move the vehicle system in the opposite direction the pin 180 may be removed from bracket 178 and the bar 162 moved down against the bracket 168 and the pin 180 inserted again above the bar 162. Therefore it may be seen that the bar 162 and arm 60 will be locked in the position whereby the dogs 144 are moved from the wheel. Also the ratchet plate 168 may be inactivated by placing the bolt 176 through one of the holes in plate 174 to hold the ratchet plate 168 away from the wheel. The plate 174 extends through slot arm 182 which depends from arm 138. However if the prime mover 86 is not stopped when the pipe 20 is all the way down, no damage will be done. The plate 168 is disengaged and the wheel will rotate backwards against the pressure of spring 150 rather than cause damage as the embodiment of FIG. 7 would.

The operation of the lock is basically the same as that shown in FIGS. 7 and 8 as described above, i.e. when the pipe is in the lower position and sprinkling water or when the pipe is being raised by the arm 60 the dogs 144 lock the wheel against movement. When the bar 162 rotates the lever 158 this removes the dogs 144 from the lugs 38 of the wheel 26. Also rotation of the arm 138 permits the depending slot arm 182 to move toward the wheel 26 thus engaging the ratchet plate 168. When the motor and when the prime mover 86 and shaft 82 are reversed the lock is again engaged as in the previous embodiment.

It will be apparent that the embodiments shown are only exemplary and that various modifications can be made in construction, materials, and arrangement within the scope of the invention as defined in the appended claims.

I claim as my invention:

1. An irrigation system comprising:
    (a) an elongated pipe adapted to carry water under pressure,
    (b) said pipe resting on and supported by the ground while watering,
    (c) a plurality of wheels,
    (d) an arm rotatably mounted about the axis of each wheel,
    (e) the pipe attached to each of the arms so that the axis of each wheel is parallel to the axis of the pipe,
    (f) a frame for each wheel,
    (g) each frame mounted for rotation about the axis of the wheel relative to both the wheel and the arm,
    (h) an elongated shaft parallel to the pipe,
    (i) the shaft journaled for rotation to each arm,
    (j) a sprocket at each wheel mounted for rotation on the arm,
    (k) means for rotating each of the sprockets responsive to rotation of the shaft,
    (l) a chain extending around each of the wheels and sprockets to cause relative rotation between the wheel and arm responsive to rotation of the sprocket,
    (m) a releasable lock means on each of the frame for locking frame to the wheel, and
    (n) means on each of the arms for releasing the lock means when the arm is in a predetermined position.

2. The invention as defined in claim 1 with the addition of:
    (o) a plurality of standards adapted to carry sprinklers on the pipe,
    (p) a coupling connected to each of the standards,
    (q) each of said couplings parallel to said pipe, and
    (r) a tube adapted to support a sprinkler
    (s) rotatably mounted on each coupling.

3. The invention as defined in claim 2 wherein: the couplings are co-axial with the wheels, so that rotation of the arm and thus the pipe does not move the tube.

4. The invention as defined in claim 2 with the addition of:
    (t) a draining connector connected to the end of each tube adapted to support a sprinkler,
    (u) each draining connector having an arcuate underside, and
    (v) a valve extending through a hole in the arcuate underside to drain the water therefrom.

5. A wheel unit for an irrigation system comprising:
    (a) a wheel of a large diameter,
    (b) a frame pivoted about the axis of the wheel,
    (c) said frame having ground engaging means on either end for preventing the rotation of the frame,
    (d) an arm on the wheel rotatably mounted relative to the axis of the wheel and to the frame,
    (e) a clamp on said arm, said clamp having a cylindrical section parallel to the axis of the wheel,
    (f) said clamp being means for attaching an elongated pipe to said arm with the axis of the pipe parallel to the axis of the wheel,
    (g) means causing a relative rotation between the arm and the wheel,
    (h) releasable lock means on the frame for locking the frame to the wheel so that the wheel may not rotate relative to the ground and the relative rotation between the arm and the wheel causes the arm to rotate about the wheel,
    (i) means on the arm for releasing the lock means so that the wheel is free to rotate relative to the frame, and
    (j) means limiting the relative rotation of the arm to the frame so that with the lock between the frame and the wheel released and the arm limited from further rotation relative to the frame, additional relative rotation between the arm and wheel causes the wheel to rotate along the ground.

6. A wheel unit for an irrigation system comprising:
    (a) a frame,
    (b) a wheel mounted on the frame for relative rotation about its axis,
    (c) said frame having ground engaging means in front and behind the wheel for prohibiting rotation of said frame relative to the ground,
    (d) lock means on the frame for locking the frame to the wheel to prevent rotation of the wheel,
    (e) an arm on the wheel mounted for rotation about the axis of said wheel,
    (f) means on the arm for clamping an elongated irrigation pipe thereto,
    (g) a bar on said arm,
    (h) a trip on said lock means to disengage said lock means,
    (i) said bar being means for contacting said trip to thus release said lock,
    (j) said bar also being means for engaging said frame to prevent additional relative rotation between the arm and the frame, and
    (k) means for causing relative rotation between said arm and said wheel so that with the frame locked to the wheel, rotation of the arm causes the arm to rotate upward from the ground to a point where said bar trips the lock and releases the frame from the wheel and additional relative rotation between the arm and the wheel causes the wheel to roll along the ground.

7. An irrigation system comprising:
    (a) an elongated pipe adapted to carry water under pressure,
    (b) said pipe resting on and supported by the ground while watering,
    (c) a plurality of vehicles each attached to said pipe for moving said pipe,
    (d) means attached to the pipe for draining the contents of said pipe,
    (e) means operatively associated with the vehicles raising the pipe to a height above the ground while moving the pipe,
    (f) a drive element interconnecting the vehicles, (g) said drive element being means for activating the means for raising the pipe, and (h) said drive element also being means for moving the vehicles and thus the pipe.

8. An irrigation system comprising:
(a) an elongated pipe adapted to carry water under pressure,
(b) said pipe resting on and supported by the ground while watering,
(c) a plurality of vehicles each attached to said pipe for moving said pipe,
(d) means attached to the pipe for draining the contents of said pipe,
(e) means operatively associated with the vehicles raising the pipe to a height above the ground while moving the pipe,
(f) a prime mover located on one vehicle,
(g) a mechanical power transmission element connecting the vehicles,
(h) the mechanical power transmission element drivingly connected to the prime mover,
(i) the prime mover being means for powering the means for raising the pipe through the mechanical power transmission element, and
(j) the prime mover also being means for moving the vehicles and thus the pipe through the mechanical power transmission element.

9. An irrigation system comprising:
(a) a plurality of vehicles,
(b) each vehicle having an arm rotatably mounted thereon,
(c) a rotatable element extending between all the vehicles and journaled to all of said arms,
(d) means rotating each of said arms and thus raising the element,
(e) said means rotating each of said arms responsive to rotation of said element, and
(f) means moving each vehicle and thus the element,
(g) said means moving each vehicle also responsive to rotation of said element.

10. The invention as defined in claim 9 with the addition of:
(h) a pipe adapted to carry water under pressure,
(i) said pipe attached to the arms of each of said vehicles so that it also is elevated and moved responsive to rotation of said element.

11. An irrigation system comprising:
(a) a plurality of wheels,
(b) an arm rotatably mounted about the axis of each of the wheels,
(c) a rotatable element extending between all the wheels,
(d) said element journaled to all the arms,
(e) means locking the wheels against rotation,
(f) means rotating each of said arms relative to its wheel responsive to rotation of said element, and
(g) means unlocking the wheels responsive to the position of said arms.

12. A vehicle for carrying an irrigation pipe comprising:
(a) a frame,
(b) a wheel mounted for rotation about its axis on the frame,
(c) lugs on the wheel,
(d) a pipe arm mounted for rotation about the axis of the wheel on the frame,
(e) a lock mean locking the wheel to the frame including:
(f) a lock arm pivoted to the frame,
(g) at least one dog pivoted to the lock arm which contacts the lugs on the wheel when the lock arm is in the engaged position,
(h) means limiting the movement of the dog so that the wheel may rotate in only one direction when the lock arm is in the engaged position, and (i) means responsive to the position of the pipe arm rotating the lock arm out of engaged position.

13. The invention as defined in claim 12 with the addition of:
(k) a ratchet plate pivoted to the frame, so that the plate contacts the lugs in the engaged position, and
(l) means limiting the movement of the latch plate toward the wheel responsive to the position of the lock arm.

14. An irrigation system comprising:
(a) an elongated pipe adapted to carry water under pressure,
(b) a plurality of vehicles each attached to said pipe for moving said pipe,
(c) means operatively associated with the vehicles raising the pipe to a height above the ground while moving the pipe,
(d) means moving the vehicles and thus the pipe, and
(e) means maintaining the pipe slightly above the ground at each vehicle and resting on the ground between vehicles when pipe is in the lower position so that the pipe is swayed when portions of the pipe are resting on the ground.

15. The invention as defined in claim 14 with the addition of:
(f) a plurality of standards on the pipe, each standard adapted to support a sprinkler,
(g) a coupling on each of the standards,
(h) each of said couplings having an axis parallel to said pipe, and
(i) a tube adapted to support a sprinkler mounted for rotation on the coupling about the axis of the coupling.

16. An irrigation system comprising the combination of:
(a) an elongated pipe adapted to carry water under pressure,
(b) a plurality of tubes extending normal to said pipe,
(c) said pipe adapted to support a sprinkler at each point a tube extends from said pipe,
(d) each tube adapted to support a sprinkler,
(e) a plurality of vehicles attached to said pipe,
(f) said vehicles being means for transporting the pipe from one location to another, and
(g) said vehicles also being means for elevating the pipe above ground and lowering the pipe to the ground.

17. An irrigation system comprising:
(a) an elongated pipe adapted to carry water under pressure,
(b) said pipe adapted to be transported along the ground normal to the axis of the pipe,
(c) a plurality of standards extending vertically upward from said pipe adapted to carry sprinklers,
(d) a swivel coupling on each standard,
(e) each swivel coupling being above said pipe and parallel thereto,
(f) a tube adapted to carry a sprinkler attached to each swivel coupling, and
(g) each tube extending at right angles to the pipe.

18. An irrigation sprinkler system comprising:
(a) a pipe adapted to carry water under pressure,
(b) a plurality of vehicles,
(c) an arm pivoted to each vehicle and each arm attached to the pipe,
(d) the pivot points of the arms co-axial to one another and parallel to the pipe,
(e) a plurality of couplings attached to the pipe,
(f) the couplings co-axial with the pivot points, and
(g) a tube for each coupling,
(h) each coupling means for pivoting one of the tubes normal to the pipe so that the tubes do not move when the arms rotate.

19. The invention as defined in claim 18 with the addition of:

(i) means draining the water from each tube responsive to pressure in the tube attached at the terminal of the tube, (j) the means draining also being means attaching a sprinkler to each tube.

20. A draining connector comprising:
(a) a hollow body,
(b) a coupling on the hollow body adapted to connect it to a tube to supply water thereto,
(c) a second coupling on the hollow body at right angles to the first coupling adapted to connect a sprinkler thereto,
(d) the hollow body having an arcuate underside,
(e) the radius of curvature of the arcuate underside being substantially larger than either coupling,
(f) the arcuate underside having a hole therethrough, and
(g) resilient valve means extending through the hole for closing the hole responsive to pressure in the hollow body.

21. An irrigation system comprising:
(a) an elongated pipe adapted to carry water under pressure,
(b) vehicle means transporting said pipe normal to the axis of the pipe,
(c) said vehicle means also being means elevating said pipe above the ground while being transported,
(d) a plurality of couplings attached to the pipe,
(e) a tube attached to each coupling,
(f) each tube adapted to carry a sprinkler and to trail behind the pipe, and
(g) a conduit rigidly attaching each coupling below the pipe when being moved so that the conduit acts as a lever to transmit pull from the tube into torque on the pipe, which torque is transmitted to the vehicle means.

References Cited in the file of this patent

UNITED STATES PATENTS

| | | |
|---|---|---|
| 2,726,895 | Behlen | Dec. 13, 1955 |
| 2,834,634 | Johnson | May 13, 1958 |

FOREIGN PATENTS

| | | |
|---|---|---|
| 374,330 | Germany | Apr. 23, 1923 |